No. 806,064. PATENTED NOV. 28, 1905.
W. CARTER.
FISHING REEL.
APPLICATION FILED JULY 8, 1902.
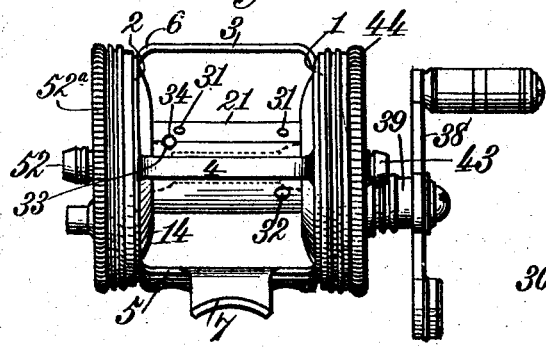
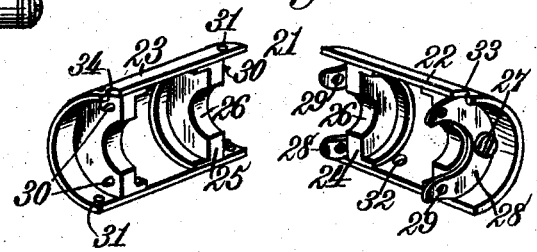
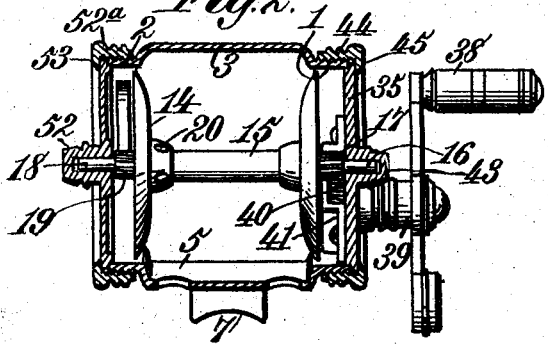
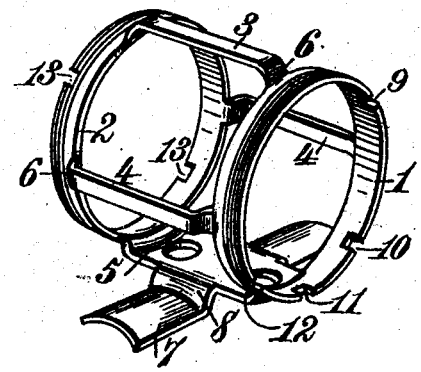
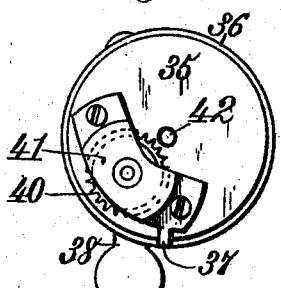
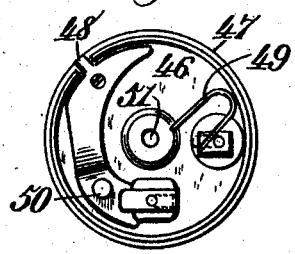
Witnesses
Robert Everett
T. O. Parker
Inventor
William Carter
By James L. Norris
Atty.

UNITED STATES PATENT OFFICE.

WILLIAM CARTER, OF LOUISVILLE, KENTUCKY.

FISHING-REEL.

No. 806,064.  Specification of Letters Patent.  Patented Nov. 28, 1905.

Application filed July 8, 1902. Serial No. 114,787.

*To all whom it may concern:*

Be it known that I, WILLIAM CARTER, a citizen of the United States, residing at Louisville, in the county of Jefferson and State of Kentucky, have invented new and useful Improvements in Fishing-Reels, of which the following is a specification.

This invention relates to certain new and useful improvements in fishing-reels.

The invention aims to provide a fishing-reel which shall be extremely simple in its construction, strong, durable, light in weight, efficient in its operation, and comparatively inexpensive to set up.

The invention further aims to construct a fishing-reel of large line capacity—one that the parts can be readily separated, so they can be cleaned and oiled, and one that the handle of the reel can be adjusted to various positions.

The invention further aims to provide a reel with an integral seat and also with a removable spool core or arbor, which when in use forms a reel that is suitable for light-bait casting, and a reel that will take in line rapidly and at the same time hold sufficient line for ordinary fishing, but when the removable core or arbor is detached from the reel it permits the fisherman to use the reel for heavy fishing where considerable power is required.

With the above and other advantages and objects in view the invention consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like numerals of reference indicate corresponding parts throughout the several views, and in which—

Figure 1 is an elevation of the reel with the removable spool core or arbor in position. Fig. 2 is a longitudinal sectional view with the core or arbor removed. Fig. 3 is a detail view of the removable core or arbor with the sections forming the same separated. Fig. 4 is a perspective view of the reel-frame. Figs. 5 and 6 are interior elevations of the handle-supporting plate and the click and drag mechanisms supporting plate, respectively; and Fig. 7 is an elevation of a modified form of the reel-frame.

Referring to the drawings by reference-numerals, the reel-frame is constructed of a single piece of suitable material cylindrical in cross-section and formed at each end with a concentric collar 1 2, respectively, each of which has its periphery screw-threaded. Collar 1 is at the front end of the frame and the collar 2 at the rear end thereof. The collars 1 2 are connected together by a plurality of bars 3, 4, and 5, having their ends bent toward the collars at an inclination, as at 6, and formed integral with the inner edge of the collars 1 2. The bar 3 is termed the "top" bar, the bars 4 the "side" bars, and the bar 5 the "bottom" bar. These bars are also termed the "raised" bars, as they extend away from the collars 1 2 and upon a different plane to that portion of the periphery of the collars at the end of the bars. It is obvious that by this construction a greater line-space is secured than if the periphery of the bars extended in the same plane as that portion of the periphery of the collars at the ends of the the bars. The bottom raised bar 5 is preferably of a greater width than the bars 3 4, although the bar 5 may be of the same width as the bars 3 4; but as the bar 5 forms a support for the reel-seat 7 it is preferred to construct the said bar 5 wider than the other bars to increase the strength thereof. The bar 5 a suitable distance from each end is curved downwardly, as at 8, and this curved portion of the said bar 5 is formed integral with the reel-seat 7, the latter consisting of an elongated strip of suitable material, preferably of concave curvature transversely.

The collar 1 has its outer edge formed with a series of notches 9, 10, 11, and 12, forming seats, the seat 9 arranged in the edge at about forty-five degrees of its circumference, the seat 10 at about one hundred and thirty-five degrees, the seat 11 at about one hundred and eighty degrees, and the seat 12 at about two hundred and twenty-five degrees. Although these seats 9, 10, 11, and 12 may be arranged at other points of the outer edge of the collar 1, it has been found from use of the reel that the arrangement of the seats as above set forth is the preferable one. The function of the seats 9, 10, 11, and 12 will be hereinafter set forth. The collar 2 has its outer edge formed with a pair of diametrically-arranged notches 13, forming seats, the function of which will be hereinafter set forth.

The reference-numeral 14 denotes the spool, which is constructed in the ordinary form and provided with a core 15. Into one end of the core 15 the spindle 16 of the pinion 17 extends. The spindle also projects from the outer side of the pinion 17, so it will be of such length as to extend in a suitable bearing means, hereinafter referred to. Into the other end of the core 15 a spindle 18 of the pinion 19 extends. The spindle 18 also projects a suitable distance from the outer side of the pinion 19, so it will extend into a suitable bearing means, hereinafter referred to. The core 15 is provided with an opening 20 for attaching the line thereto. This opening may be disposed at any point of the length of the core, but is shown at one end thereof.

The reference-numeral 21 denotes the removable spool core or arbor, and which is formed of a pair of semicylindrical hollow sections 22 23, each of which has secured to its inner face a pair of semicircular web-braces 24 25, respectively, provided with a semicylindrical cut-away portion 26 in the outer edge thereof. Secured to the outer face of each of the web-braces 24 by means of the screws 27 is a substantially horseshoe-shaped fastening-spring 28, its free ends projecting over the outer edge of the brace 24 and provided with the openings 29. Secured to each of the web-braces 25 near the outer edge and projecting outwardly from the outer side thereof is a pair of studs 30. These studs are arranged diametrically opposite to each other and are adapted to engage in the openings 29 in the ends of the springs 28 for securing the sections 22 23 together and around the core 15 of the spool 14, the core 15 being seated in the semicylindrical cut-away portions 26 of the web-braces. The section 23 is provided near each of its straight edges with a pair of suitably-disposed openings 31, in which a tool or other suitable means can be inserted to release the ends of the springs 28 from the studs 30, so that the sections 22 23 can be separated and removed from the core 15.

The reference-numeral 32 denotes an opening in the section 22 for the passage of the line therethrough from the core 15, and the reference-numerals 33 34 denote a pair of notches formed in the sections 22 23, which when the sections are secured to the core form an opening for the passage of the line therethrough.

The reference-numeral 35 denotes one of the end plates for the reel-frame and which is termed the "handle-carrying" plate. The plate 35 is formed with an annular ridge or flange 36, so that when the plate 35 is mounted in the collar 1 the ridge or flange 36 will engage the outer edge of the collar. The plate 35 is also provided with a shoulder 37, which when the plate is mounted within the collar 1 is adapted to engage in one of the seats 9, 10, 11, and 12. When the shoulder 37 engages in one of the seats 9, 10, 11, or 12, the plate 36 is prevented from moving. Furthermore, the mounting of the shoulder in one of the seats 9, 10, 11, and 12 fixes the plate in its adjusted position. Therefore the function of the notches forming the seats 9, 10, 11, and 12 will permit of the plate 35, which carries the handle 38, to be adjusted so that the handle will be positioned at various points. The plate 35 is provided with a sleeve 39, through which extends a shaft carrying on its end the handle 38 and on its inner end the gear 40, which is surrounded by the bearing-bracket 41 for the shaft, the bearing-bracket 41 being secured to the inner face of the plate 35. The latter is formed with a centrally-arranged opening 42, which registers with a bearing-cap 43, connected to the outer face of the plate 35. The projecting end of the spindle 16, which carries the pinion 17, is adapted to extend through the opening 42 into the bearing-cap 43, so that the pinion 16 will be engaged and operated by the gear-wheel 40 when the latter is rotated by the handle 38.

The reference-numeral 44 denotes a fastening-band provided with an inwardly-extending annular bead 45, and which is also exteriorly screw-threaded. This band is adapted to be mounted upon the collar 1 and have the screw-threads thereof engage with the screw-threads of the collar and to have its bead 45 engage with the outer face of the plate 35, so that when the fastening-band 44 is screwed home the plate 35 will be securely retained in position within the collar 1.

The reference-numeral 46 denotes a plate for the other end of the reel-frame, and which is termed the "click and drag mechanisms supporting plate." The plate 46 is provided with an annular ridge or flange 47, so that when the plate 46 is mounted in the collar 2 the ridge or flange 47 will engage the outer edge of the collar 2. The plate 46 is also provided with a shoulder 48, which when the plate is mounted within the collar 2 is adapted to engage in one of the seats 13. This will prevent movement of the plate 46. By providing the pair of seats in the outer edge of the collar 2 the click mechanism 49 or drag mechanism 50 can be arranged near the top or near the bottom of the reel-frame. The plate 46 is formed with a centrally-arranged opening 51, registering with a bearing-cap 52, and through the opening and into the bearing-cap is adapted to extend the spindle 18 of the pinion 19 in such a manner that the pinion 19 will be engaged by the clicking spring of the click mechanism.

The reference-numeral $52^a$ denotes a fastening-band which is exteriorly screw-threaded and provided with an inwardly-extending annular bead 53. The screw-threads of the band are adapted to engage with the screw-threads of the collar 2, and the bead of the band is adapted to engage the outer face of the plate 46, so that when the band 52 is screwed home the plate 46 will be securely held in its adjusted position within the collar 2.

In the modified form shown in Fig. 7 the construction of reel is substantially the same as that hereinbefore described with the exception that the bars 54, which connect the collars 55 56 together, are not raised, but the outer face of the bars 54 being substantially in the same plane as that portion of the periphery of the collars 55 at the ends of the bars. The lower bar in this construction is described by the reference-numeral 57, and it has formed integral therewith in any suitable manner a seat 58.

From the foregoing description, taken in connection with the accompanying drawings, it will be evident that I have devised a fishing-reel which is extremely simple in its construction and one that can be readily separated and easily set up, as well as one in which the handle can be adjusted to different positions when desired by the fisherman. It will also be evident that by providing the reel with a removable core or arbor the reel is suitable for light-bait casting or ordinary fishing, as well as for heavy fishing when desired, as the line-space can be increased or diminished by attaching the removable arbor or core or dispensing with it. It will also be evident that by constructing the reel-frame with integral raised bars an increase in line-space is obtained and the objection to using separate pillows or bars is overcome. A further advantage is providing one of the bars of the reel-frame with an integral seat which overcomes the employment of separate means for attaching a reel-seat thereto.

The above and other advantages, it is thought, will be evident from a fishing-reel constructed in accordance with the description set forth in connection with the accompanying drawings, and it will also be evident that minor changes may be made in the details of construction without departing from the general spirit of my invention.

Having thus fully described my invention, what I claim as new, and desire to secure by Letters Patent, is—

1. A fishing-reel comprising a reel-frame having its edges at each end formed with a plurality of notches forming seats, and end plates suitably mounted in the ends of the reel-frame and adapted to engage in the notches to prevent the movement of said end plates.

2. In a fishing-reel, a reel-frame consisting of a pair of collars exteriorly screw-threaded and having notched edges, a series of raised bars formed integral with said collars for connecting them together, end plates adapted to engage in the said collars and one of the notches thereof to prevent the movement of said plates, and means engaging the collars for securing the plates thereto.

3. In a fishing-reel, a reel-frame, a spool mounted therein, means connected with said frame and with said spool for operating the latter, and a removable arbor suitably attached to said spool.

4. In a fishing-reel, a removable arbor consisting of a pair of sections adapted to be connected together.

5. In a fishing-reel, a reel-frame having its ends formed with a plurality of notches, plates mounted in the ends of the frame and adapted to engage in one of the said notches at each end to prevent their movement, a spool mounted in the said frame and engaging in the said plates, a removable arbor suitably connected with said spool, and means carried by one of the said plates for operating said reel.

6. In a fishing-reel, a reel-frame provided in its outer edges with a plurality of notches and further provided with raised bars, plates mounted in the ends of the said frame and adapted to engage in the notches thereof to prevent their movement, a spool mounted in the said frame and engaging the said plates, a removable arbor for said spool, and means carried by one of the plates for operating the said spool.

7. In a fishing-reel, a tubular frame provided with integral bars and collars having their outer edges notched to form seats, and adjustable end pieces engaging in the seats of the said collars, said end pieces adapted to carry the bearings for the reel-spool.

8. In a fishing-reel, a reel-frame, and a shiftable click and drag mechanism supporting plate removably connected to the rear end of the reel-frame, said plate when shifted adapted to vary the position of the click and drag mechanism.

9. In a reel, the combination with a reel-frame and a spool mounted therein, of means connected to one end of the frame and acting as a bearing for one end of the spool, adjustable means connected to the other end of the frame and acting as a bearing for the other end of the spool and adapted to carry the operating mechanism for the spool, and a removable arbor for said spool.

10. In a fishing-reel, a tubular reel-frame provided at one end with a plurality of seats, click and drag mechanisms, a plate for supporting said mechanisms, said plate provided with a shoulder adapted to engage in one of the said seats, and means for securing said plate to the said frame.

11. In a fishing-reel, a removable arbor consisting of a pair of detachable sections, and means carried by one of the sections and engaging with the other of the sections for connecting them together.

12. In a fishing-reel, a reel-frame provided with a plurality of raised bars and a pair of collars integral therewith, a spool mounted therein, shiftable end plates forming bearings for said spool mounted in the said collars, and means engaging with the said collars for securing the end plates in position.

13. In a fishing-reel, a reel-frame provided with a plurality of raised bars and a pair of collars integral therewith, a spool mounted therein, shiftable end plates forming bearings for said spool mounted in the said collars, means engaging with the said collars for securing the end plates in position, and a reel-seat formed integral with one of said bars.

14. In a fishing-reel, a reel-frame provided with a plurality of raised bars and a pair of collars integral therewith, a spool mounted therein, shiftable end plates forming bearings for said spool mounted in the said collars, means engaging with the said collars for securing the end plates in position, a reel-seat formed integral with one of said bars, and a removable arbor adapted to be connected with the said spool.

15. In a fishing-reel, a reel-frame provided at one end with an exteriorly-screw-threaded collar having a plurality of notches formed therein, a click and drag mechanism supporting plate adapted to engage in one of said notches, and means engaging the screw-threads of said collar for removably connecting said plate to the frame.

16. In a fishing-reel, a reel-frame having one edge formed with a series of seats, and a handle-carrying plate provided with a shoulder adapted to engage in the said seats thereby adjusting the position of the handle carried thereby.

17. In a fishing-reel, a reel-frame consisting of a pair of collars, a plurality of raised bars formed integral with the collars for connecting them together and a reel-seat integral with one of the said bars, adjustable end plates engaging the said collars and forming bearings for the reel-spool, and means for securing the said plates to the collars.

18. In a fishing-reel, a reel-frame, and a shiftable plate extending and engaging in one end of said frame, a click and a drag mechanism carried by said plate, and means for removably connecting said plate to the frame.

19. In a fishing-reel, a reel-frame, a plate extending therein, a click and drag mechanism carried by said plate and means for removably connecting the plate to the frame.

20. A fishing-reel comprising a tubular reel-frame provided with integral bars and collars, said bars having their ends bent toward and terminating in the collars.

21. In a fishing-reel, a tubular frame provided with integral bars and collars, said bars having their ends bent toward and terminating in the collars, a removable head-plate mounted on one of said collars, a removable head-plate mounted in the other of said collars, and means for securing the head-plates to the collars.

In testimony whereof I have hereunto set my hand in presence of two subscribing witnesses.

WILLIAM CARTER.

Witnesses:
R. T. COLSTON,
R. N. GRIFFEN.